United States Patent
Gao et al.

(10) Patent No.: US 11,169,635 B2
(45) Date of Patent: Nov. 9, 2021

(54) INPUT DEVICE, ELECTRONIC DEVICE AND CONTROL METHOD

(71) Applicant: Lenovo (Beijing) Co., Ltd., Beijing (CN)

(72) Inventors: Ying Gao, Beijing (CN); Zhihu Wang, Beijing (CN); Xiaoren Cheng, Beijing (CN); Xiaodong Chen, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/931,516

(22) Filed: May 13, 2020

(65) Prior Publication Data

US 2020/0363896 A1   Nov. 19, 2020

(30) Foreign Application Priority Data

May 13, 2019   (CN) .......................... 201910394247.9
May 31, 2019   (CN) .......................... 201910475901.9

(51) Int. Cl.
*G06F 3/044* (2006.01)
*G06F 3/041* (2006.01)

(52) U.S. Cl.
CPC ............ *G06F 3/0414* (2013.01); *G06F 3/044* (2013.01); *G06F 3/04182* (2019.05)

(58) Field of Classification Search
None
See application file for complete search history.

(56) References Cited

U.S. PATENT DOCUMENTS

| | | | | |
|---|---|---|---|---|
| 2011/0227872 A1* | 9/2011 | Huska | ..................... | H01H 13/85 345/174 |
| 2015/0036159 A1* | 2/2015 | Nakatsu | ............. | H04N 1/00411 358/1.13 |
| 2015/0153857 A1* | 6/2015 | Aubry | ..................... | G06F 3/041 345/174 |
| 2017/0336891 A1* | 11/2017 | Rosenberg | .............. | G06F 3/044 |

FOREIGN PATENT DOCUMENTS

| | | |
|---|---|---|
| CN | 104461105 A | 3/2015 |
| CN | 109189262 A | 1/2019 |
| CN | 109669581 A | 4/2019 |
| CN | 110162198 A | 8/2019 |
| KR | 20090127544 A | 12/2009 |

* cited by examiner

*Primary Examiner* — Carl Adams
(74) *Attorney, Agent, or Firm* — Anova Law Group, PLLC

(57) ABSTRACT

An input device includes a position acquisition device, a force sensor, and a processing unit. The position acquisition device is configured to obtain position information of at least one touch point. The force sensor is configured to obtain input mechanical information of a pressing force that is applied to the at least one touch point. The processing unit is configured to determine input information based at least on the position information of the least one touch point and the mechanical information of the pressing force. The position acquisition device and the force sensor are stacked on a cover of an electronic device.

16 Claims, 14 Drawing Sheets

INPUT DEVICE, ELECTRONIC DEVICE AND CONTROL METHOD

CROSS-REFERENCE TO RELATED APPLICATION

This application claims the priority to Chinese Patent Application Nos. 201910394247.9, entitled "Input Device and Electronic Device", filed on May 13, 2019 and 201910475901.9, entitled "Electronic Device and Control Method," filed on May 31, 2019, the entire contents of which is incorporated herein by reference.

TECHNICAL FIELD

The present disclosure relates to an input device, an electronic device and a control method.

BACKGROUND

With the development of science and technology, electronic devices evolve each day. For better user experience (UE), the touch-sensitive input function is being continuously improved. The force-sensitive touchpad (e.g., "Force-Pad") can provide a user interface at fingertips, and support more intuitive gestures, which brings different input experience to users. The force-sensitive touchpad does not need set buttons, and need only to detect the user's pressing strength to implement click and other operations. However, the existing force-sensitive touchpads are disposed by making the surface of the electronic device hollow to expose the surface of the force-sensitive touchpad and detect the pressing force. But the force-sensitive touchpad cannot be hidden under other components, which causes limitations to the changes that can be made to the shape of the electronic devices and the use of the force-sensitive touchpads.

SUMMARY

According to one aspect of the present disclosure, an input device is provided. The input device includes a position acquisition device, a force sensor, and a processing unit. The position acquisition device is configured to obtain position information of at least one touch point. The force sensor is configured to obtain input mechanical information of a pressing force that is applied to the at least one touch point. The processing unit is configured to determine input information based at least on the position information of the least one touch point and the mechanical information of the pressing force. The position acquisition device and the force sensor are stacked on a cover of an electronic device.

According to another aspect of the present disclosure, an electronic device is provided. The electronic device includes a cover that covers a specific surface of the electronic device and an input device. The input device includes a position acquisition device, a force sensor and a processing unit. The position acquisition device is configured to obtain position information of at least one touch point. The force sensor being is configured to obtain input mechanical information of a pressing force that is applied to the at least one touch point. The processing unit is configured to determine input information based at least on the position information of the least one touch point and the mechanical information of the pressing force. The position acquisition device and the force sensor are stacked on the cover, and the cover forms at least a part of a housing of the electronic device.

According to further aspect of the present disclosure, a control method is provided. The method includes: in response to detecting that a touch on a cover of the electronic device, obtaining mechanical information of a pressing force applied to at least one touch point located on an upper surface of the cover; and controlling a feedback device to provide operation feedback to the user based on the mechanical information of the at least one touch point.

The above aspects will be described in detail with accompanying drawings.

BRIEF DESCRIPTION OF THE DRAWINGS

For a more complete understanding of the present disclosure and its advantages, reference will now be made to the following description in conjunction with the drawings.

DETAILED DESCRIPTION OF THE EMBODIMENTS

Figure 1:
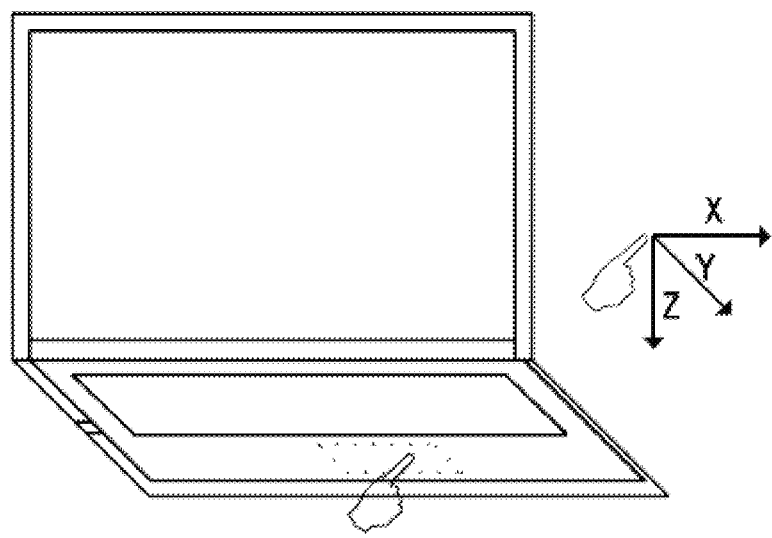
FIG. 1 illustrates an application scenario of an input device and an electronic device according to an embodiment of the present disclosure.

Hereinafter, embodiments of the present disclosure will be described with reference to the drawings. However, it should be understood that these descriptions are only exemplary and are not intended to limit the scope of the present disclosure. In the following detailed description, for ease of explanation, many specific details are set forth to provide a comprehensive understanding of the embodiments of the present disclosure. However, it is obvious that one or more embodiments can also be implemented without these specific details. In addition, in the following description, the description of well-known structures and techniques are omitted to avoid unnecessarily obscuring the concepts of the present disclosure.

The terminology used herein is for describing specific embodiments only, and is not intended to limit the present disclosure. The terms "comprising", "including", etc., which are used to indicate the existence of the described features, steps, operations, and/or components, but do not exclude the presence or addition of one or more other features, steps, operations, or components.

All terms used herein, including technical and scientific terms, have the meaning commonly understood by those skilled in the art unless otherwise defined. It should be noted that the terms used herein should be interpreted as having a meaning consistent with the context of the specification, and should not be interpreted in an idealized or overly stereotypical manner.

When using an expression similar to "at least one of A, B, and C", generally speaking, it should be interpreted according to the meaning generally understood by those skilled in the art. For example, "a system having at least one of A, B, and C" shall include, but not limited to, systems with A alone, B alone, C alone, A and B, A and C, B and C, and/or systems with A, B, C, etc. When using an expression similar to "at least one of A, B, or C", in general, it should be interpreted according to the meaning generally understood by those skilled in the art. For example, "a system having A, B, or C" shall include, but not limited to, systems with A alone, B alone, C alone, A and B, A and C, B and C, and/or systems with A, B, C, etc.

Some block diagrams and/or flowcharts are shown in the drawings. It should be understood that some of the blocks in the block diagrams and/or flowcharts or combinations thereof may be implemented by computer program instructions. These computer program instructions can be provided to the processor of a general-purpose computer, special-purpose computer, or other programmable data processing device, so that when executed by the processor, these instructions can be configured to implement the functions described in these block diagrams, flowcharts, or operated devices. The technology of the present disclosure may be implemented in the form of hardware and/or software (including firmware, microcode, etc.). In addition, the technology of the present disclosure may take form of a computer program product on a computer-readable storage medium that stores instructions. The computer program product can be used by or in conjunction with an instruction execution system.

An embodiment of the present disclosure provides an input device applied to an electronic device. The electronic device includes a cover that covers a specific surface of the electronic device. The input device includes a position acquisition device, a force sensor, and a processing unit. The processing unit obtains the position information of at least one touch point through the position acquisition device and mechanical information obtained through the force sensor, and then determines the input information based at least on the position information and the mechanical information. The position acquisition device and the force sensor are stacked up on the cover. The input device can support a hidden ForcePad design scheme under the entire cover, and can realize a 3-D gesture input without opening a window in the ForcePad area. A ForcePad structure may include a touch sensor or a position acquisition device, a force sensor, and a haptic feedback device. The haptic feedback device can provide touch feedback when a touch is applied on the input device. The structure and manufacturing of the input device provided by the present disclosure can be simple, the cost can be reduced by more than 50%.

FIG. 1 illustrates an application scenario of an input device and an electronic device according to an embodiment of the present disclosure. It should be noted that FIG. 1 is only an example of a scenario to which the embodiments of the present disclosure can be applied to help those skilled in the art understand the technical content of the present disclosure, but it does not mean that the embodiments of the present disclosure cannot be applied to other devices, systems, environment or scenes.

As shown in FIG. 1, the user can perform input an operation on an input area shown by the dotted line, such as scrolling a display page when the finger slides up and down, switching the display page when the finger slides left and right, inputting the click instruction when the finger clicks, etc., and implementing the multi-point control function. In addition, a 3-D gesture input can also be realized, for example, a corresponding scrolling display page when the finger slides up and down in the input area with a light force, corresponding adjustment of volume, brightness, etc., when the finger slides up and down in the input area with a great force. That is to say, the user can input from three dimensions, X, Y, and Z, which greatly increases the type of input information and helps to improve the user's convenience. The dotted area indicates the area where the input device is located. The input device may be exposed outside the surface of the electronic device, may be embedded in the surface of the electronic device, or may be covered by a cover of the electronic device.

Figure 2A:
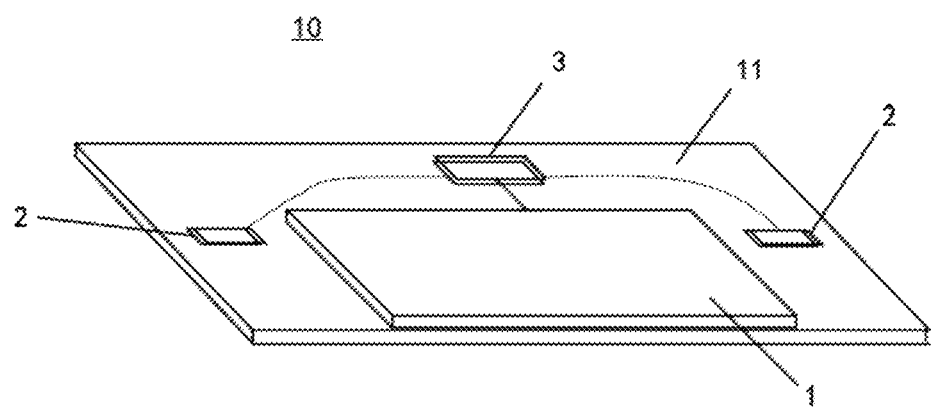
FIG. 2A is a schematic structural diagram of an input device according to an embodiment of the present disclosure.

FIG. 2A is a schematic structural diagram of an input device according to an embodiment of the present disclosure. An input device 10 is applied to an electronic device, and the electronic device includes a cover 11 that covers a specific surface of the electronic device.

As shown in FIG. 2A, the input device 10 shown may include a position acquisition device 1, a force sensor 2 and a processing unit 3.

The position acquisition device 1 is configured to obtain the position information of the at least one touch point, the force sensor 2 is configured to obtain input mechanical information, and the processing unit 3 is configured to determine input information based at least on the position information and the mechanical information. The position acquisition device 1 and the force sensor 2 are stacked up on the cover 11. The specific surface of the electronic device may be an operation surface of the electronic device, such as a side on which the ForcePad needs to be disposed. For example, the cover 11 may be used as a housing on a surface of a notebook computer where a keyboard is disposed.

Optionally, the above stacking arrangement may include a situation where, for example, the position acquisition device 1 and the force sensor 2 may be directly arranged on different areas of an inner surface of the cover 11, respectively. In another example, the force sensor 2 may be disposed on the position acquisition device 1, and the position acquisition device 1 is disposed on the inner surface of the cover 11, which is not limited herein. The touch point may be located in an area corresponding to the position acquisition device 1 on the cover 11, and the touch point may be a touch point of a user's finger or a stylus pen on the cover 11 corresponding to an area of the position acquisition device 1. When the user's finger or the stylus pen performs a touch operation on the cover in the area of the position acquisition device, the touch point on the position acquisition device may draw a tiny current so that a circuit board of the position acquisition device can accurately determine the current value to calculate the touch position.

For example, the touch point is located on an outer surface of the cover corresponding to the area of the position acquisition device, and the cover serves as at least a part of the housing of the electronic device. In another example, the position acquisition device 1 and the force sensor 2 may be disposed between a glass cover and a surface of the housing of the electronic device where the keyboard is disposed (e.g. a metal or composite material housing for disposing a keyboard on a notebook computer). The cover 11 may be conformal to at least part of the surface of the housing, and the outer surface of the position acquisition device 1 and a detection surface of the force sensor 2 fit to the inner surface of the cover 11. This can provide an overall design with a flat surface without opening a window for the ForcePad, which reduces the thickness of the input device, the manufacturing difficulty and the cost.

Figure 2B:
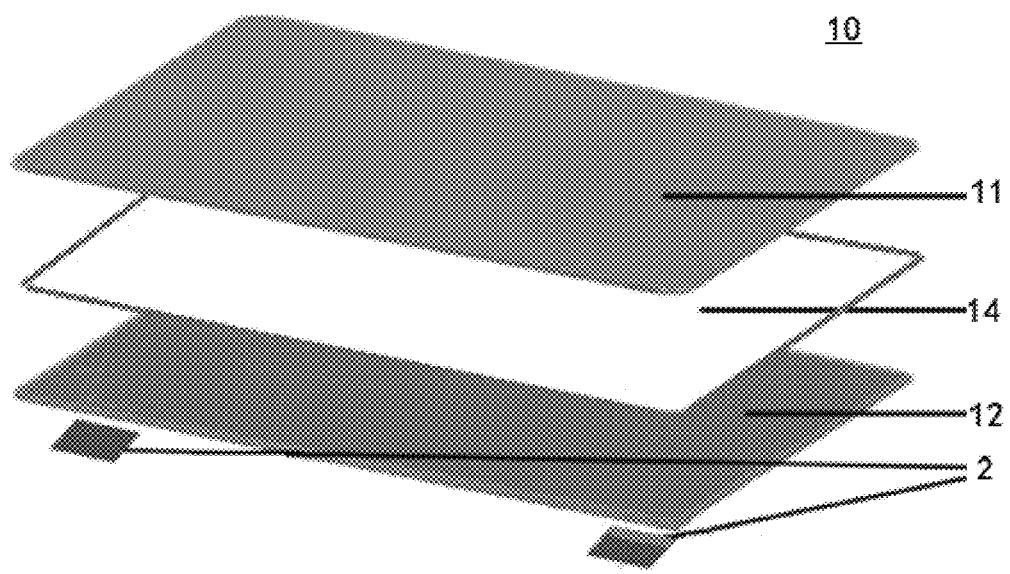
FIG. 2B illustrates an exploded schematic view of the input device according to another embodiment of the present disclosure.

The processing unit 3 may include an operation determination unit and an input unit. The operation determination unit is configured to determine input information based at least on the position information of the at least one touch point and the mechanical information, and the input unit is configured to input the input information. The processing unit 3 may be integrated in the position acquisition device 1, for example, on the circuit board 12 of the position acquisition device 1, as shown in FIG. 2B. The operation determination unit may, based on the position information of the at least one touch point, determine the user's touch gesture, sliding gesture, multi-point touch gesture, etc. In addition, the operation determination unit can also determine the pressing force information applied by the user to the position acquisition device 1 according to the pressing force signal sent by the force sensor 2, so that the 3-D input information desired by the user can be determined with reference to the user's operation gesture and pressing force information, for example, operation information such as light click, heavy click, multipoint haptic touch, etc. Then, operation instruction corresponding to the 3D input information may be sent to a central processing unit (CPU) of the electronic device through the input unit.

Specifically, the position acquisition device 1 may adopt a haptic technology based on capacitance detection, or a haptic technology based on resistance detection, etc. As long as the technology that can accurately detect coordinates of the touch point, it is not limited herein. The following uses capacitive haptic technology as an example.

FIG. 2B illustrates an exploded schematic view of the input device according to another embodiment of the present disclosure.

As shown in FIG. 2B, the position acquisition device 1 may include a cover 11, a circuit board 12, and a capacitance detection layer. The cover 11 has an outer surface and an inner surface, and the outer surface provides a touch area. The material of the cover 11 includes, but is not limited to, at least one of: a glass material, a composite material, a polymer material, and a ceramic material. The area of the cover 11 in FIG. 2B is only exemplary, and the area of the cover 11 may be greater than or equal to the area of the capacitance detection layer. The force sensor 2 may be disposed on the cover 11 at a position other than the position of the circuit board 12, or may be disposed on the capacitance detection layer, or may be disposed on the cover 11 at a position other than the position of the capacitance detection layer, as long as the input mechanical information can be easily detected. In one embodiment, a thickness of the force sensor 2 is less than or equal to a thickness of the circuit board 12 and is disposed on the cover 11 at a position other than the position of the circuit board 12, so that the thickness of the input device 10 can be reduced as much as possible to realize the hidden ForcePad design under the entire cover 11.

For example, the capacitance detection layer may fit to the inner surface of the cover 11, and the circuit board 12 may be disposed on the other side of the capacitance detection layer, such as on the side that the capacitance detection layer faces inward. Specifically, the input device 10 may further include an adhesive layer 14, and the capacitance detection layer and the circuit board 12 may be fixed together by the adhesive layer 14. When the force sensor 2 is located on the circuit board 12, the adhesive layer 14 needs to have good mechanical parameter conductivity.

In a specific embodiment, the position acquisition device 1 may include a four-layer composite glass screen. An inner surface of the glass screen and an interlayer may be each coated with indium tin oxide (ITO) coating, an outermost layer may be a protective layer of silica glass, and the interlayer ITO coating may be used as a working surface. For example, four electrodes may be drawn at the four corners of the quadrangular working surface, and the inner layer of ITO may be a shielding layer to ensure a good working environment. When a finger touches the touch area on the cover corresponding to the position acquisition device 1, a coupling capacitance may be formed between the user and the surface of the position acquisition device 1 due to the electric field of the human body. For high-frequency current, the capacitor is a conductor, so the finger draws a tiny current from the touch point. A current value of the current flowing through the four electrodes is proportional to a distance from the finger to the four corners, so that the circuit board can obtain the haptic position accurately according to the current value. The calculation accuracy of coordinates of the touch point more can be achieved above 99%.

The processing unit 3 may be electrically connected to the circuit board 12. Alternatively, the processing unit 3 may be integrated on the circuit board 12, and the force sensor 2 may be disposed on the cover 11 or on the circuit board 12.

The force sensor 2 may be a force sensor based on elastic deformation, a force sensor based on force-sensitive material, a force sensor based on elastic wave detection, etc., as long as it can meet the design requirements (e.g., sensitivity requirements, design size requirements, response sensitivity requirements, etc.), which will not be limited here. The number of the force sensors 2 may be single or plural, e.g., 1, 2, 4, 8, etc. In addition, the force sensor 2 may be disposed at any position of a surface of the cover 11 or the position acquisition device 1 facing the interior of the device, e.g., one force sensor 2 may be disposed at a central position, or any intermediate position of any side, or any corner of the surface of the position acquisition device 1 facing the interior of the device. In another example, the two force sensors 2 may be respectively disposed in the vicinity of any two sides of the surface of the cover 11 or the position acquisition device 1 facing the interior of the device, or one at the central position and the other close to any one side, or near the two ends close to one side such as the side closest to the user, etc. In another example, four force sensors 2 can be respectively disposed on the surface of the position acquisition device 1 facing the interior of device at each position close to the four corners, etc. The above are only exemplary descriptions, and cannot be construed as limiting the present disclosure. Optionally, the two force sensors 2 may be respectively disposed on the surface of the position acquisition device 1 facing the interior of the device at near-end positions near the first side of the position acquisition device 1, and the first side is the side closest to the user.

Figure 2C:
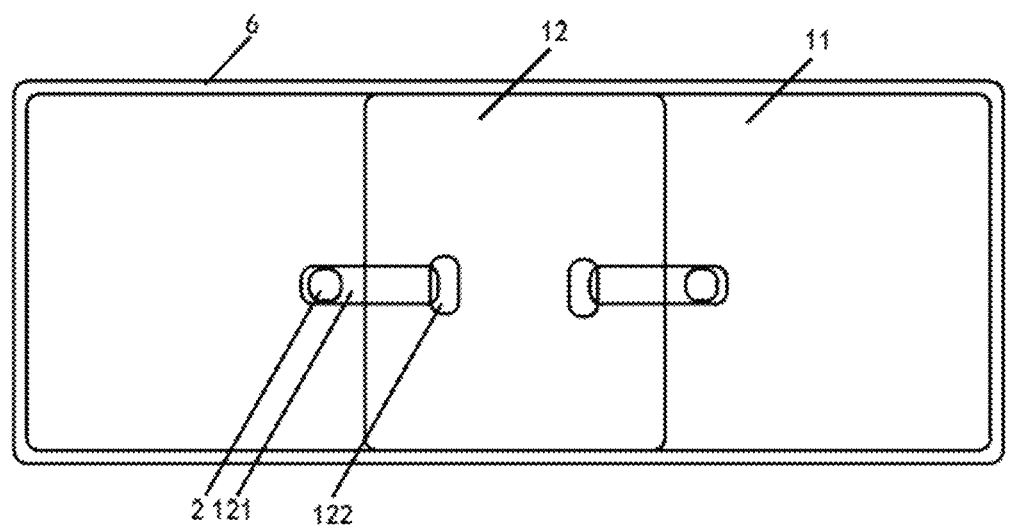
FIG. 2C illustrates a bottom view of the input device according to another embodiment of the present disclosure.

FIG. 2C illustrates a bottom view of the input device according to another embodiment of the present disclosure.

As shown in FIG. 2C, the force sensor 2 may be an elastic wave sensor configured to detect elastic waves. The elastic wave sensor is connected to the circuit board 12 through a flexible circuit 121, to ensure the reliability of signal transmission. The flexible circuit 121 may be connected to the circuit board 12 through a connection component 122.

The cover 11 can be fixed to a specific surface of an electronic device through a connection structure 6. For example, it can be fixed to the surface of the electronic device by a mechanical structure such as a snap, a bolt, a plug hole, etc. In addition, the cover 11 can be fixed to the specific surface of an electronic device by rubber or foam. The cover 11 can also be fixed by welding, chemical reaction, etc., and is not limited herein.

In addition, the electronic device may further include a spacer structure, such as a spacer layer, and the spacer layer may be provided between the connection structure 6 and the housing of the operation surface of the electronic device, and the surface of the force sensor 2 may fit to the cover 11 or the circuit board 12 and be provided with mechanical support by the spacer layer. As such, the force sensor 2 can be prevented from being damaged caused by pressing force that exceeds its bearing capacity. The spacer layer may be a hollow plate with certain mechanical strength, and its thickness may be comparable to the thickness of the force sensor. The spacer layer may be thickened or thinned according to design requirements. In addition, the spacer layer is not necessary, and may be removed according to design requirements.

Figure 2D:
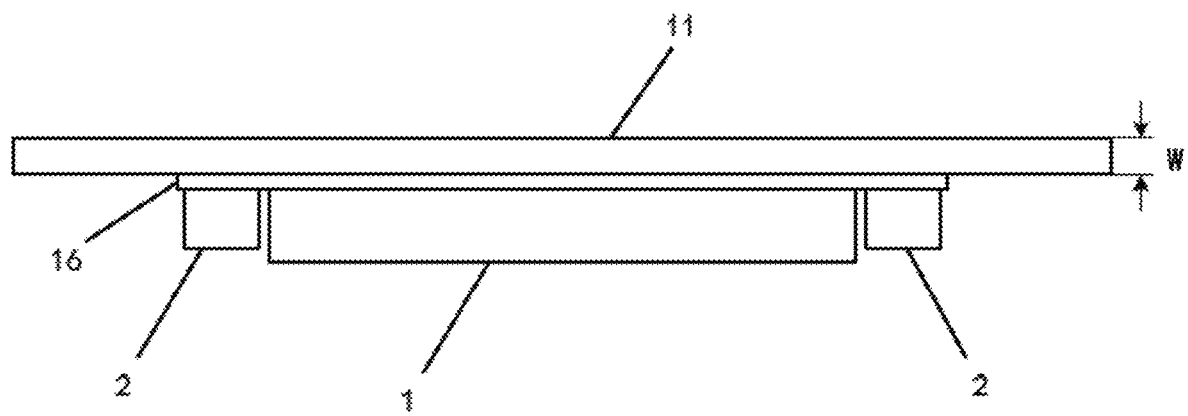
FIG. 2D illustrates a cross-sectional view of the input device according to another embodiment of the present disclosure.

FIG. 2D illustrates a cross-sectional view of the input device according to another embodiment of the present disclosure.

In this embodiment, a layer of circuit board may also be provided on the inner surface of the cover, e.g., a flexible printed board (FPC). As shown in FIG. 2D, the FPC 16 may fit to the inner surface of the cover 11, and the outer surface of the cover 11 may provide the operation surface for obtaining position information of the touch point. The position acquisition device 1 and the force sensor 2 are disposed on the FPC 16. The cover 11 may be a glass cover, with a thickness W about 0.55 mm, and a size about 300 mm×80 mm. A thickness of the FPC 16 is about 0.1 mm, a thickness of the position acquisition device 1 and the force sensor 2 (in the same direction as W) is about 1 mm. Therefore, the overall thickness of the ForcePad device is within 1.2 mm, which saves about 3.0 mm space compared to the whole machine in the existing force-sensitive touchpad with a multi-cantilever structure, without a need to open a window in the housing of the electronic device to dispose the force-sensitive touchpad.

For the input device provided by the present disclosure, the position acquisition device may fit to the entire cover such as the interior of the glass cover, or a touchpad module where the force sensors may simultaneously fit to the inner surface of the glass cover on both sides. As such, the mechanical information input by the user can be obtained by using the force sensor to detect the elastic wave signal. For example, two force sensors may detect the glass vibration signal and calculate the input mechanical information based on the vibration signal to achieve the 3-D input.

Figure 2E:
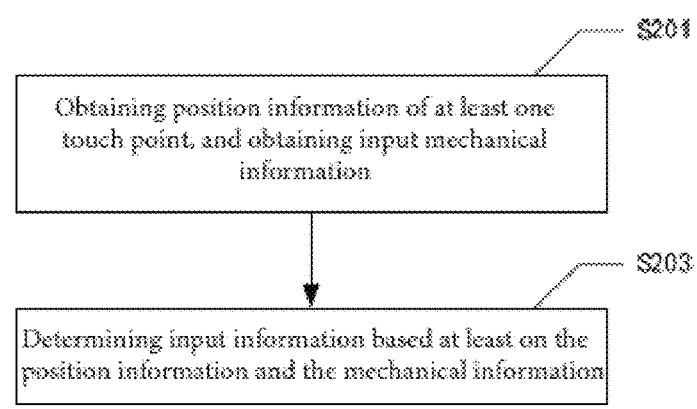
FIG. 2E illustrates a flowchart of the input method according to an embodiment of the present disclosure.

FIG. 2E illustrates a flowchart of the input method according to an embodiment of the present disclosure.

As shown in FIG. 2E, the illustrated input method may include steps S201 to S203.

In S201, the position information of at least one touch point may be obtained to obtain the input mechanical information.

Specifically, the position information of the at least one touch point and the mechanical information that is input through the force sensor can be obtained by the position acquisition device. The touch point may be located at the area on the outer surface of the cover corresponding to the position acquisition device 1.

For example, the position information of the at least one touch point of the user and the mechanical information of the pressing force applied by the user to the cover 11 that is obtained by the force sensor (e.g., an elastic wave sensor) as described above, can be obtained by the position acquisition device (e.g., a capacitive touch sensor) as described above.

In S203, the input information may be determined based at least on the position information and the mechanical information.

Specifically, the input information may be determined based at least on the position information of the at least one touch point and the above-mentioned mechanical information. An example of the input information may be, e.g., turning pages, scrolling the screen, clicking an icon in a human-computer interaction interface, viewing the attribute information of an object, etc.

The method may further include the following step: inputting the input information. The input information may be input to the electronic device, and may also be input to other related electronic devices, e.g., electronic devices that can operate on virtual objects displayed in each other's interface.

In another embodiment, the mechanical information can also be modified to improve haptic accuracy. Specifically, the method may further include the following steps.

After acquiring the position information of the at least one touch point, the mechanical information may be calibrated based at least on the position information of the at least one touch point to obtain the calibrated mechanical information.

Correspondingly, determining the input information based at least on the position information of the at least one touch point and the mechanical information includes determining the input information based on at least the position information of the at least one touch point and the calibrated mechanical information.

Specifically, the processing unit 3 is further configured to: calibrate the mechanical information based at least on the position information of the at least one touch point to obtain the calibrated mechanical information; and determine the input information based on the position information of the at least one touch point and the calibrated mechanical information.

The calibration of the mechanical information may include two ways: one is to reduce noise of the elastic waveform, which may help to improve the accuracy of the mechanical information, and the other is to use the position information of the touch point to calibrate the mechanical information.

Regarding the scheme for reducing the noise of the elastic waveform, for example, the noise of the elastic waveform at a plurality of coordinates can be first reduced based on the coordinates of different touch points; that is, the elastic waves at different coordinates have different characteristic noise, and these noises can be filtered out, then the calibrated mechanical information can be obtained based on the elastic waveform after noise reduction.

In one embodiment, the processing unit may also be configured to reduce the noise of the elastic waveform at the position based on the positions of different touch points, and/or compensate the mechanical information based on the compensation information to obtain the compensated mechanical information. The compensation information may be determined according to the actual position of the touch point obtained by the position acquisition device and the position calculated by the elastic wave sensor based on the elastic waveform.

Since the force sensor 2 needs to be fixed at a specific position, e.g., corresponding to a certain position of the cover 11, and the user's touch points may be located at various positions of the cover 11, when the same intensity of pressing force is applied to different touch points, signals detected by the force sensor 2 may be different. Therefore, in order to improve the accuracy of the detected pressing force value of each touch point, the mechanical information may be calibrated. In addition, due to the influence of the environment, there can be noise in the signal output by the force sensor 2, so noise reduction can be performed. In addition, if an elastic wave sensor is used as the force sensor 2, since the elastic wave sensor detects all elastic waveforms, and it can be difficult to calculate a Z-direction pressing force with complex waveform superposition, e.g., requiring a large amount of computing resources, the calculation time being too long and response speed of the input device 10 being influenced by the long calculation time, it is necessary to simplify the algorithm and use compensation to ensure the accuracy of the obtained mechanical information.

In one embodiment, the force sensor 2 may be an elastic wave sensor, and the processing unit 3 may further include a calibration unit, the calibration unit is configured to compare the mechanical information based on at least the position information of the at least one touch point to calibrate the mechanical information to obtain the calibrated mechanical information. Accordingly, the operation determination unit is specifically configured to determine the input information based on the position information of the at least one touch point and the calibrated mechanical information. It should be noted that when the force sensor 2 is an elastic wave sensor, there may be two elastic wave sensors, which may not consume a lot of computing resources or cause the response time to be too long, and the calculation accuracy may also be high. Optionally, the elastic wave sensor may be disposed on the side of the input device 10 close to the user, and the usage rate in the area where the side is located is high, which helps to improve the accuracy.

The calibration unit may include a noise reduction subunit and a compensation subunit. The noise reduction subunit may be configured to reduce noise of the elastic waveform at a plurality of coordinates based on the coordinates of different touch points, and the compensation subunit may be configured to compensate the mechanical information based on the compensation information to obtain the calibrated mechanical information. The compensation information may be determined according to the actual coordinates of the touch point obtained by the position acquisition device and the coordinates calculated by the elastic wave sensor according to the elastic waveform.

For example, the calibration compensation method may be configured to improve the calculation accuracy of the Z-related information, and at the same time reduce the time required for the calculation. For example, the position information (e.g., represented by X, Y) obtained by the position acquisition device 1 can be used as closed-loop feedback input information to calibrate a deviation of the Z-related information based on original calculation by the elastic wave sensor, and finally obtain accurate data of the Z-related information.

Figure 2F:
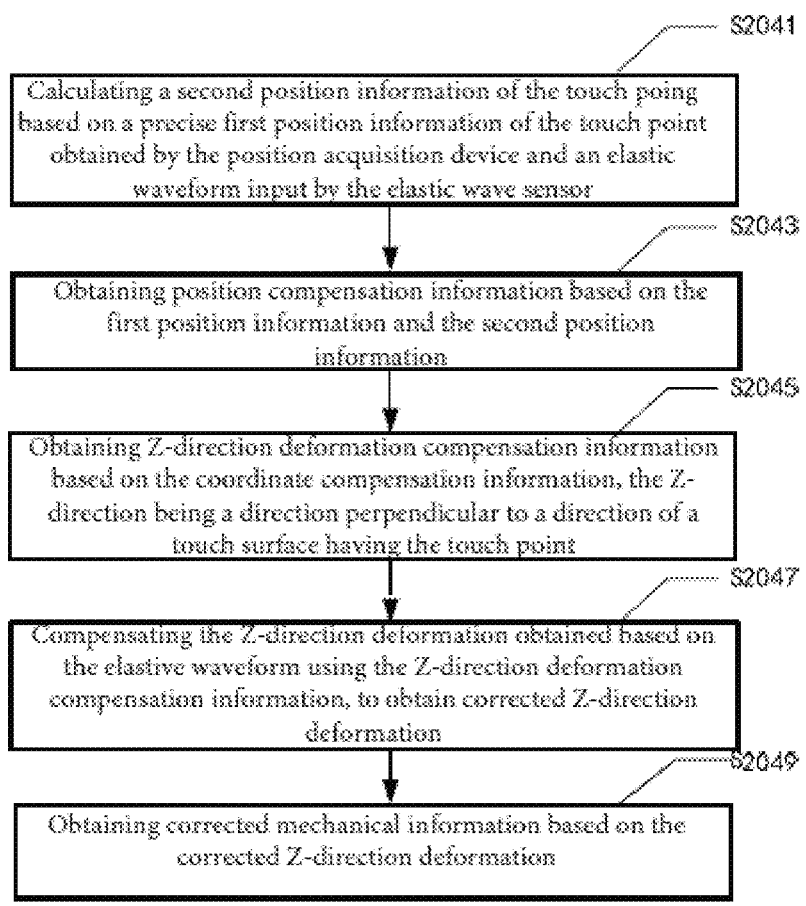
FIG. 2F illustrates a flowchart of a method of calibrating mechanical information according to an embodiment of the present disclosure.

FIG. 2F illustrates a flowchart of a method of calibrating mechanical information according to an embodiment of the present disclosure.

As shown in FIG. 2F, calibrating the mechanical information based at least on the position information of the at least one touch point to obtain the calibrated mechanical information may include steps S2041 to S2049.

In S2041, a first position information (such as coordinate information) of the accurate touch point may be obtained by the position acquisition device, and a second position information of the touch point may be calculated through the elastic waveform output by the elastic wave sensor. The algorithm for obtaining the first position information and the second position information may be the same as the existing technology, and is not limited herein. It should be noted that there are various algorithms for obtaining the second touch coordinates based on the elastic waveform, and an algorithm with a fast response speed can be selected to improve the response speed. The accuracy can be compensated by a subsequent compensation algorithm.

In S2043, the first position information and the second position information may be used to obtain position compensation information, such as coordinate compensation information.

Specifically, the coordinate information may be, e.g., (X, Y), and the coordinate compensation information may be information that compensates the coordinate X or the coordinate Y, respectively. For example, the information that compensates for X may be calculated by equation (1).

$$F_x(t) = \alpha_0(t) \times F_x'(t) \quad (1)$$

$F_x'(t)$ is the X coordinate calculated based on the elastic waveform, and $\alpha_0(t)$ is the compensation value (the X coordinate compensation value obtained in S2043), and $F_x(t)$ represents the actual X coordinate of the touch point obtained by the position acquisition device.

The compensation information for Y can be calculated by equation (2).

$$F_y(t) = \alpha_1(t) \times F_y'(t) \quad (2)$$

$F_y'(t)$ is the Y coordinate calculated based on the elastic waveform, and $a_1(t)$ is the compensation value (the Y coordinate compensation value obtained in S2043), and $F_y(t)$ represents the actual Y coordinate of the touch point obtained by the position acquisition device.

In S2045, Z-direction deformation compensation information may be obtained based on the coordinate compensation information, and Z direction is a direction perpendicular to the touch surface to which the touch point belongs.

Specifically, equation (3) can be used to obtain the Z-direction deformation compensation information.

$$\alpha_3(t) = \alpha + \alpha_0(t) + \beta \times \alpha_1(t) \quad (3)$$

$\alpha_3(t)$ is the Z-direction deformation compensation value, and a and 0 can be empirical values, calibration values, etc., so that the Z-direction deformation compensation information (such as compensation value) can be obtained according to the X coordinate compensation value and the Y coordinate compensation value.

In S2047, the Z-direction deformation compensation information may be used to compensate the Z-direction deformation obtained based on the elastic waveform to obtain a calibrated Z-direction deformation.

Specifically, formula (4) can be used to obtain the calibrated Z-direction deformation.

$$F_z(t) = \alpha_3(t) \times F_z'(t) \quad (4)$$

$F_z(t)$ is the Z-direction deformation calculated based on the elastic waveform detected by the elastic wave sensor.

In S2049, the calibrated mechanical information may be obtained based on the calibrated Z-direction deformation.

For example, the calibrated mechanical information can be calculated based on the elastic coefficient and elastic deformation.

After the above steps, an accurate value of the mechanical information of the touch point can be obtained.

Figure 2G:
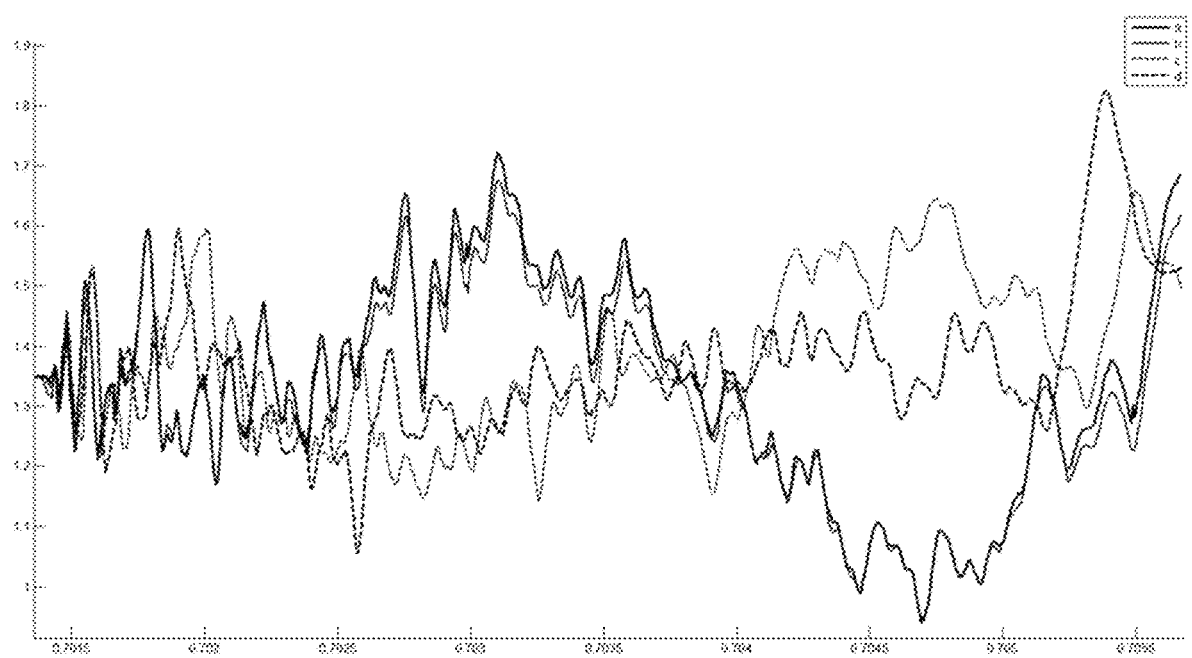
FIG. 2G is a schematic diagram of an elastic wave according to an embodiment of the present disclosure.

FIG. 2G is a schematic diagram of an elastic wave according to an embodiment of the present disclosure.

As shown in FIG. 2G, waveform a and waveform b correspond to the waveform detected when the same pressing force is applied to the same touch point. Although the waveform coincidence is high, there may be still differences, at least partly due to noise. Accordingly, the accuracy of the waveform detected by the elastic wave sensor may be improved by noise reduction. The waveform detected when the same pressing force is applied to the adjacent touch points corresponding to waveform c and waveform d can be calculated to obtain the position of the touch point.

It should be noted that the elastic wave sensor detects an elastic waveform, and the waveform cannot be detected when there is no vibration (such as not touching the cover 11). However, the solution provided by the present disclosure can be based on the elastic wave sensor to detect the mechanical information when the user continues to press the cover with the same force1 (theoretically there is no elastic waveform at this time). This is because when the user applies a force to the cover 11, the applied force usually fluctuates by a certain amplitude, and the elastic waveform can be detected at this time. The mechanical information can be calculated according to the elastic waveform. In addition, even if there is no fluctuation in the applied force, the solution provided by the present disclosure can still detect the mechanical information based on the elastic wave sensor when the user continues to press the cover 11 with the same force, because, first, after the user presses for a long time, his finger may be released, and the elastic waveform can be detected at this time. Accordingly, it can be determined whether the user was pressing the cover 11 before according to the elastic waveform. Secondly, since in the present disclosure, the position acquisition device 1 may be implemented (e.g., capacitive haptic technology) to obtain the position information of the touch point, at this time, whether the user presses the cover 11 can be certainly determined. Accordingly, whether the user continues to press the cover 11 with the same force may be determined with reference to the information output by the position acquisition device 1. In the case where the cover 11 is being continuously pressed with a changing force, the change of the force can be directly determined according to the received elastic waveform.

According to the present disclosure, after acquiring the position information of the at least one touch point and the mechanical information, the input device may determine the input information according to the preset coordinate-force-input information correspondence, and send it to the electronic device to implement a function corresponding to the input information.

Figure 3A:
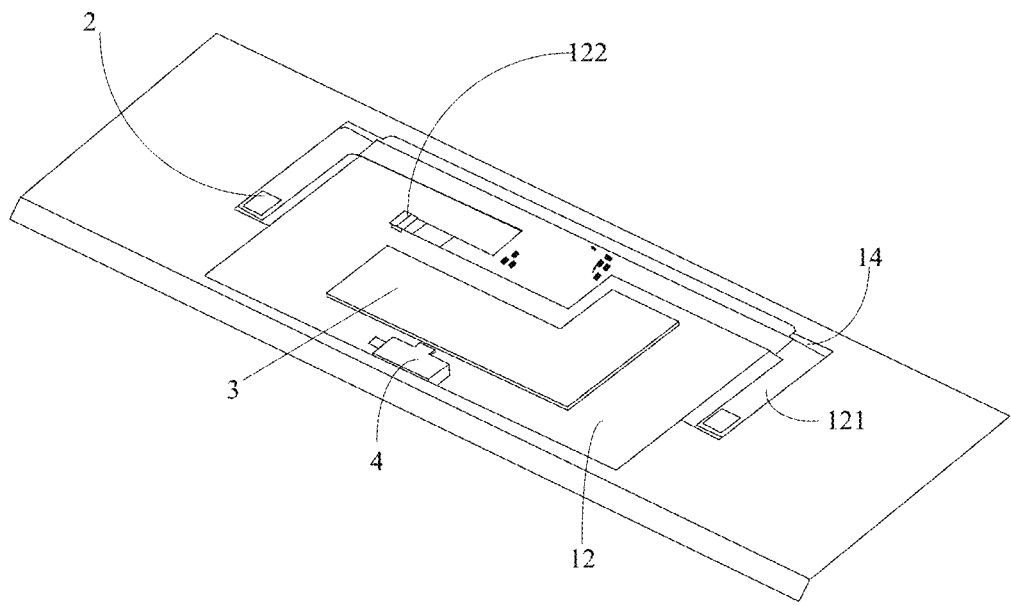
FIG. 3A illustrates a perspective schematic view of the input device according to another embodiment of the present disclosure.

FIG. 3A illustrates a perspective schematic view of the input device according to another embodiment of the present disclosure.

As shown in FIG. 3A, a schematic perspective view of the input device 10 when the inner surface of the cover 11 is turned up is provided. In this embodiment, in order to improve the UE, the user may be given feedback when he is performing an input operation. For example, when the user's finger touches the touch area of the outer surface of the cover 11 corresponding to the position acquisition device 1, vibration feedback may be given; or, when the user's finger presses the cover 11, different pressing forces reflects different vibration strengths; or when the user inputs different input information, different vibration feedback modes (e.g., continuous vibration, pulse vibration, vibration from strong to weak, and interval time of vibration being different, etc.) may be given, and will not be limited here.

Specifically, the cover serves as at least a part of the housing of the electronic device, and the electronic device may further include a haptic feedback device 4, and the haptic feedback device 4 may be specifically disposed on the input device 10 on the surface of the cover 11 at an area other than the input device 10. The force sensor 2, the circuit board 12, the cover 11, the processing unit 3, the adhesive layer 14, the FPC 121 and the connection device 122 may be as described above, and will not be repeated here.

In addition, the electronic device may further include a bracket. The bracket is configured to provide a receiving space, and the haptic feedback device 4 is configured to perform touch feedback when the input device 10 is touched or a specific operation is detected. The bracket may be disposed between the spacer layer and the housing of the electronic device, such as the bracket for a housing disposed on a bottom surface of the electronic device or a housing on the electronic device for disposing the keyboard. The haptic feedback device 4 may be disposed in the receiving space. For example, the haptic feedback device 4 may be a linear motor, a rotor motor, a vibration block, etc. The haptic feedback device 4 may also be another device that can bring about a change in tactile sensation.

In the design of the ForcePad, the user experience of the haptics needs to be considered. Due to the design scheme of the entire cover 11, haptic vibration can be easily transmitted by the cover 11 to the entire body, which causes the amplitude of vibration to be greatly reduced and inability to simulate clicking, thereby affecting the user experience.

In order to solve the above problem, the electronic device may further include a connection structure 6 configured to fix the cover 11 to the housing of the electronic device and block transmission of the haptic feedback to the housing. Specifically, the connection structure may include at least one of: foam rubber and soft rubber dot.

Figure 3B:
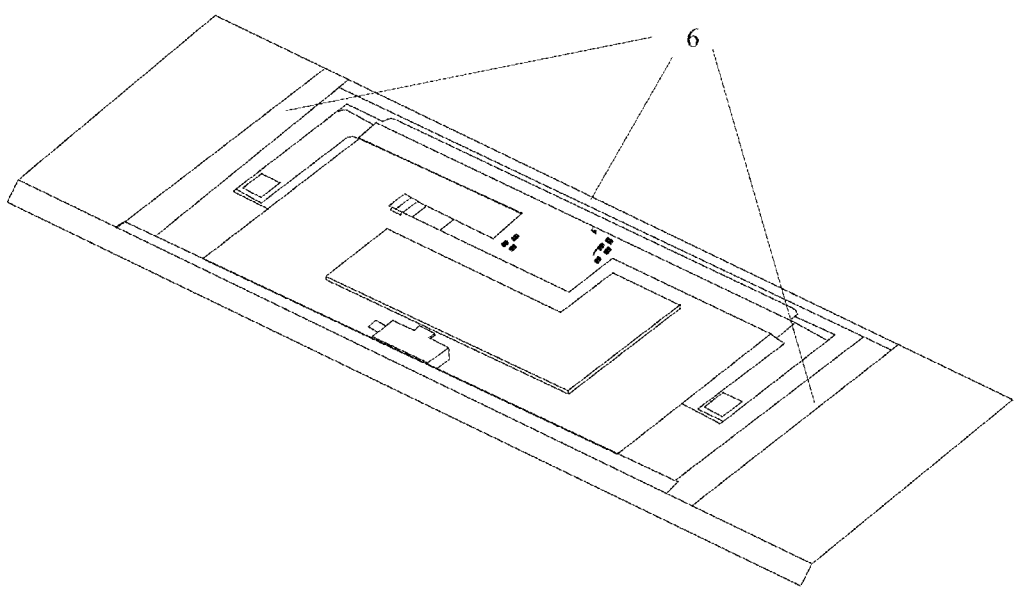
FIG. 3B illustrates a method of fixing the input device according to an embodiment of the present disclosure.
Figure 3C:
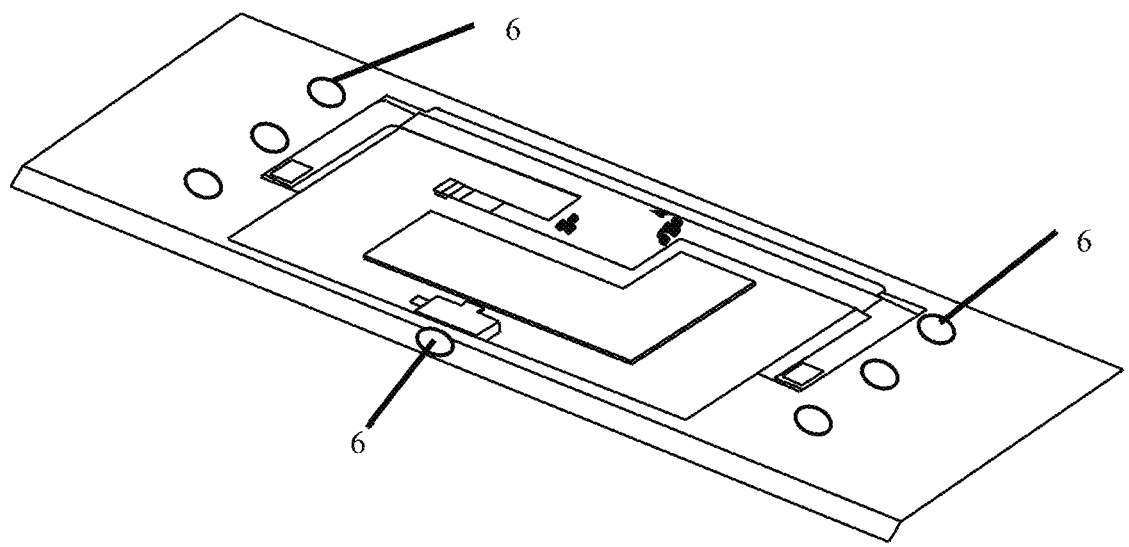
FIG. 3C illustrates the method of fixing the input device according to another embodiment of the present disclosure.

Further illustration of FIG. 3A can be made with reference to FIGS. 3B and 3C. The illustration of the cover 11, the input device 10 and the haptic feedback device 4 in FIGS. 3B and 3C can be made with reference to the related description of FIG. 3A, which will not be described in detail here again.

FIG. 3B illustrates a method of fixing the input device according to an embodiment of the present disclosure.

As shown in FIG. 3B, the connection structure 6 may include foam rubber, e.g., frame-shaped foam rubber with a window, strip foam rubber, L-shaped foam rubber, etc. A thickness of the foam rubber can be greater than the overall thickness of the input device 10, e.g., 1.3 mm. The input device 10 may be enclosed by the foam rubber to achieve a soft isolation between the cover 11 and the housing of the electronic device, which can reduce the transmission of touch feedback (e.g., vibration, etc.) to the housing of the electronic device so that the user can sense weak vibration feedback that ensures the haptic user experience.

FIG. 3C illustrates the method of fixing the input device according to another embodiment of the present disclosure.

As shown in FIG. 3C, the connection structure 6 may soft rubber dots, for example, the connection structure 6 may include 3, 4, 5, 6, 8, 10, or more soft rubber dots, etc. The size of the soft glue dots may be greater than the overall thickness of the input device 10 such as 1.5 mm. The soft rubber dots can implement a soft isolation between the cover 11 and the housing of the electronic device, for example, between the cover 11 and the housing of the electronic device or between the circuit board 12 and the housing of the electronic device, to reduce the transmission of the touch feedback (e.g., vibration, etc.) to the housing of the electronic device, so that the user can feel weak vibration feedback to ensure the haptic user experience.

Figure 4:
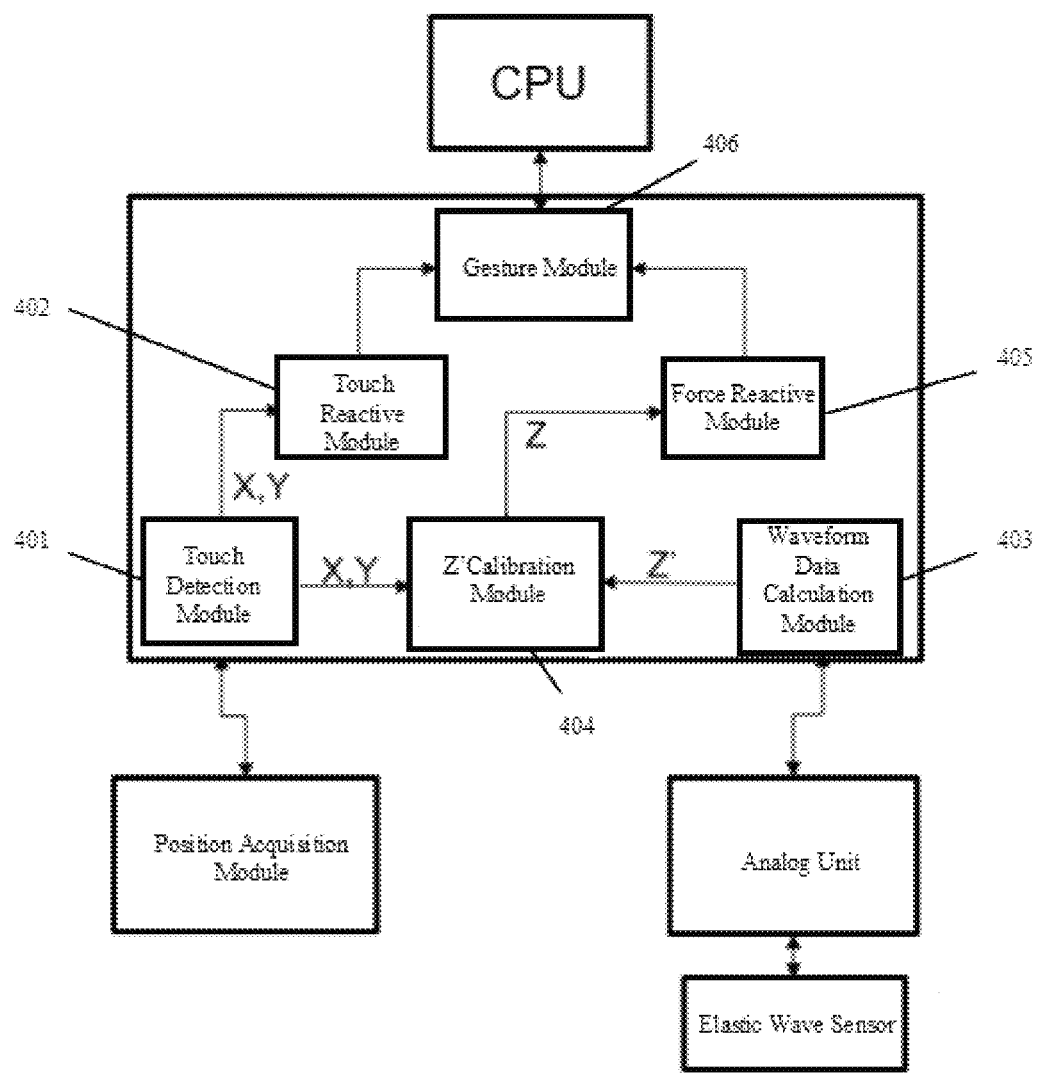
FIG. 4 is a schematic block diagram of the input system according to an embodiment of the present disclosure.

FIG. 4 is a schematic block diagram of the input system according to an embodiment of the present disclosure.

As shown in FIG. 4, the processing unit may specifically include a touch detection module 401, a touch reactive module 402, a waveform data calculation module 403, a Z' calibration module 404, a force reactive module 405, and a gesture module 406. The touch detection module 401 may be respectively connected to the position acquisition device, the touch reactive module 402 and the Z' calibration module 404, and the touch detection module 401 sends the position information (.g., position information for (X, Y)) to the touch reactive module 402 and the Z' calibration module 404. The waveform data calculation module 403 may be respectively connected to an analog unit and the Z' calibration module 404. The waveform data calculation module 403 may calculate the Z-direction deformation through the elastic waveform and send it to the Z' calibration module 404. The touch reactive module 402 may send the obtained position information (e.g., position information for (X, Y)) to the gesture module 406. The force reactive module 405 may calculate the Z-direction mechanical information using the Z-direction deformation and send it to the gesture module 406. The gesture module 406 may determine the user's gesture according to the position information for (X, Y) and the Z-direction mechanical information, and determine the input information according to the gesture, then input the input information to the CPU of the electronic device.

Any number of modules, sub-modules, or units according to the embodiments of the present disclosure, or at least partial functions of any number of them may be implemented in one module. Any one or more of the modules, sub-modules, and units according to the embodiments of the present disclosure may be implemented by being split into multiple modules. Any one or more of the modules, sub-modules, and units according to the embodiments of the present disclosure may be at least partially implemented as a hardware circuit, such as field-programmable gate array (FPGA), programmable logic array (PLA), system-on-chip, system on the substrate, system on the package, application-specific integrated circuit (ASIC), or can be implemented through hardware or firmware in any other reasonable manner that integrates or packages the circuit, or in any one or a suitable combination of any group of the three implementations of software, hardware, and firmware. Alternatively, one or more of the modules, sub-modules, and units according to the embodiments of the present disclosure may be at least partially implemented as a computer program module, and when the computer program module is executed, a corresponding function may be performed.

For example, any of the touch detection module 401, the touch reactive module 402, the waveform data calculation module 403, the Z' calibration module 404, the force reactive module 405, and the gesture module 406 may be combined and implemented in one module, or any module among them can be split into multiple modules. Alternatively, at least part of the functions of the one or more of these modules may be combined with at least part of the functions of other modules and implemented in one module. According to an embodiment of the present disclosure, at least one of the touch detection module 401, the touch reactive module 402, the waveform data calculation module 403, the Z' calibration module 404, the force reactive module 405, and the gesture module 406 may be at least partially implemented as hardware circuits, such as field-programmable gate array (FPGA), programmable logic array (PLA), system-on-chip, system on substrate, system on package, application-specific integrated circuit (ASIC), or can be integrated or packaged through hardware or firmware in any other reasonable manner that integrates or packages the circuit, or in any one or suitable combination of any group of the three implementations of software, hardware, and firmware.

Another aspect of the present disclosure also provides an electronic device, which may include the cover and the input device as described above.

The cover covers a specific surface of the electronic device, and the input device is configured to obtain input information. The description of the cover and the input device may be made with reference to the above-mentioned embodiments, which will not be repeated here.

The input device and the electronic device according to the above embodiments of the present disclosure may all provide haptic feedbacks in the situation that physical buttons are disposed on the surface of the input device or the electronic device.

Figure 3D:
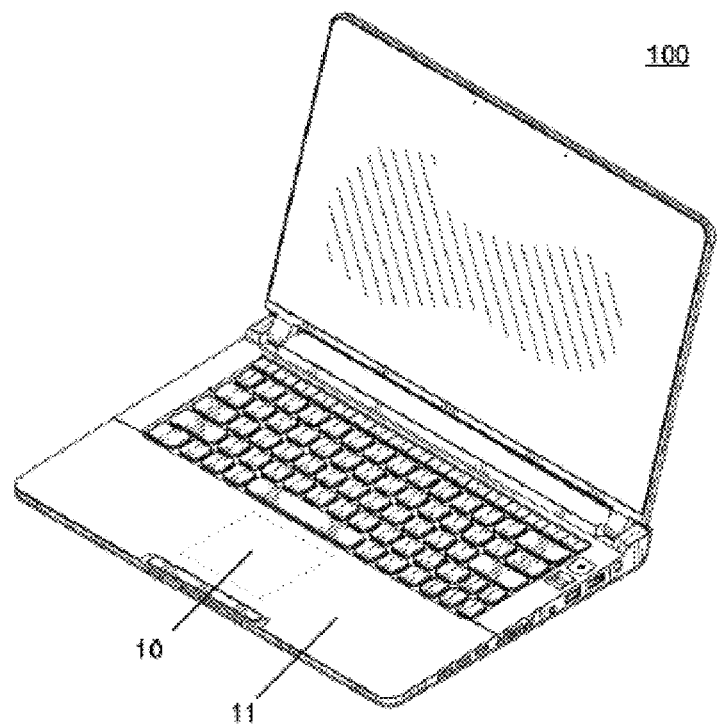
FIG. 3D illustrates a perspective view of the electronic device according to an embodiment of the present disclosure.

FIG. 3D illustrates a perspective view of the electronic device according to an embodiment of the present disclosure.

As shown in FIG. 3D, the cover 11 not only covers the surface of the input device 10, but also covers the surface of the electronic device 100 facing the user where the keyboard is disposed, so that the surface facing the user for disposing the keyboard can be a flat surface and the function of the ForcePad can be achieved, which brings better experience and visual effects to the user. In addition, since the input device 10 can be disposed on the inner surface of the cover 11, there is no need to open a window on the cover 11, which effectively reduces the manufacturing difficulty and the cost. It should be noted that the cover 11 may cover only the surface facing the user for disposing the keyboard, and may also cover an area on the surface for disposing the keyboard other than an area of the keyboard. In addition, the cover 11 may also cover at least part of the surface for disposing the keyboard and other surfaces of the electronic device, such as the bottom surface of the electronic device, the side of the electronic device, etc., which is not limited herein.

Figure 5:
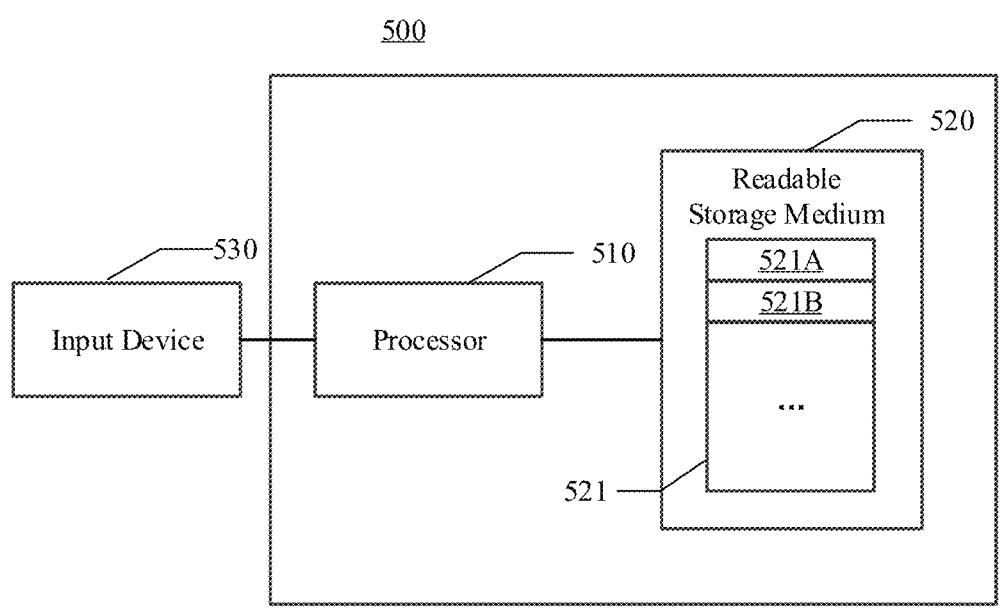
FIG. 5 is a schematic block diagram of the electronic device according to an embodiment of the present disclosure.

FIG. 5 is a schematic block diagram of the electronic device according to an embodiment of the present disclosure. The electronic device as shown in FIG. 5 is only an exemplary embodiment, and should not impose any limitation to the function and application range of the embodiments of the present disclosure.

As shown in FIG. 5, the electronic device 500 may include the input device 530, one or more processors 510, and a computer-readable storage medium 520 as described above. The input device 530 may be connected to the processor 510, and the processor 510 may execute one or more computer programs in response to input information input by the input device 530. The computer-readable storage medium 520 may be configured to store one or more computer programs. When the computer program is executed by the processor 510, the computer program may implement the function corresponding to the input information.

Specifically, the processor 510 may include, for example, a general-purpose microprocessor, an instruction set processor, and/or related chipsets, and/or a dedicated microprocessor (e.g., an application specific integrated circuit (ASIC)), and so on. The processor 510 may also include on-board memory for caching purposes. The processor 510 may be a single processing unit or multiple processing units configured to perform different actions of the method according to the embodiments of the present disclosure.

The computer-readable storage medium 520 may be, for example, a non-volatile computer-readable storage medium. Specific examples include but are not limited to magnetic storage devices such as magnetic tapes or hard disks (HDD); optical storage devices such as optical disks (CD-ROM); memory, such as random-access memory (RAM) or flash memory, etc.

The computer-readable storage medium 520 may include a program 521, which may include code/computer-executable instructions, which when executed by the processor 510, cause the processor 510 to perform the method according to the embodiments of the present disclosure or any variation thereof.

The program 521 may be configured to have, for example, computer program code including computer program modules. For example, in an example embodiment, the code in the program 521 may include one or more program modules, e.g., program module 521A, program module 521B, etc. It should be noted that the division method and the number of program modules are not fixed, and those skilled in the art can use suitable program modules or program module combinations according to the actual situation. When these program module combinations are executed by the processor 510, the processor 510 may perform the function corresponding to the input information or any variation thereof.

In an embodiment, the processor 510 may interact with the computer-readable storage medium 520 to perform the function corresponding to the input information according to the embodiments of the present disclosure or any variation thereof.

Figure 6A:
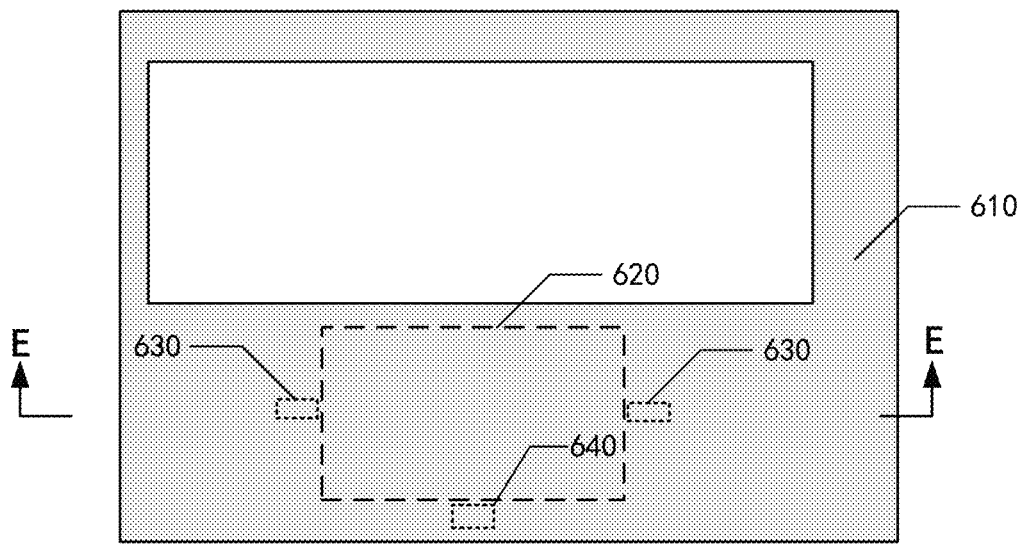
FIG. 6A is a schematic partial structural diagram of the electronic device without physical buttons according to an embodiment of the present disclosure.

The present disclosure also provides another embodiment of the electronic device, which can implement the haptic feedback without physical buttons. In this embodiment, the electronic device may be a notebook computer. FIG. 6A is a schematic partial structural diagram of the electronic device without physical buttons according to an embodiment of the present disclosure; and FIG. 6B is a schematic diagram of E-E cross section in FIG. 6A.

Figure 6B:
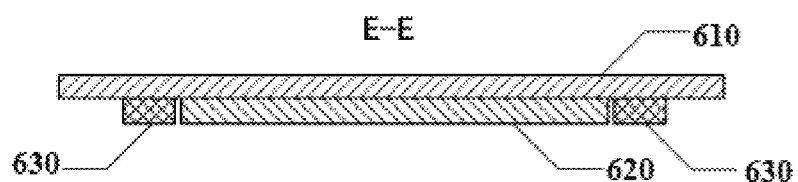
FIG. 6B is a schematic diagram of E-E cross section in FIG. 6A.

As shown in FIGS. 6A and 6B, the electronic device 600 according to this embodiment may include a cover 610, a position acquisition device 620, a force sensor 630, and a haptic feedback device 640. The position acquisition device 620 is stacked on the inner surface of the cover so that it can detect a touch operation on the outer surface of the cover. The force sensor 630 can detect a vibration wave when the user's finger presses the cover to determine the pressing force of the user's finger, and learn the user's operation intention in combination with the touch position and the pressing force, so that the electronic device can perform a corresponding operation, and provide vibration feedback through the haptic feedback device to simulate real physical buttons.

In this embodiment, the cover 610 may be a transparent glass cover. The cover 610 may cover an area other on an upper surface of a base of the electronic device, as shown in FIG. 2A. The position acquisition device may be a capacitive touch sensor. A sensing surface of the capacitive sensor may fit to the inner surface of the cover 610.

In this embodiment, the force sensor 630 may be an elastic wave sensor, and the number of the force sensor 630 may be single or plural. When the number of the force sensor 630 is plural, they may be evenly distributed at a surrounding area of the position acquisition device 620.

In this embodiment, due to the design without physical buttons, in order to have a better interactive experience when the user presses, it is necessary to give the user an operation feedback, to simulate the feedback effect of real physical buttons and improve the user experience. The haptic feedback device 640 can generate a vibration force based on the force information and transmit the vibration force to the cover, to provide operation feedback to the user.

In this embodiment, the haptic feedback device 640 may include a haptic driver and a deformable material. The deformable material deforms when the surface is subjected to an electric field. The haptic driver is configured to apply the electric field to the surface of the deformable material according to the force information, to drive the deformable material to deform and provide feedback to the user.

Figure 7:
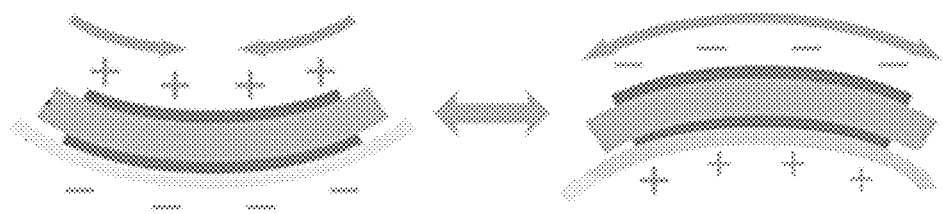
FIG. 7 is a schematic diagram of deformation of a deformable material according to an embodiment of the present disclosure.

FIG. 7 is a schematic diagram of deformation of a deformable material according to an embodiment of the present disclosure.

As shown in FIG. 7, the haptic feedback device may take advantage of inverse piezoelectric effect of the deformable material to perform vibration feedback, to achieve the effect of simulating physical buttons. The piezoelectric effect is, when certain dielectric material, e.g., deformable material, is deformed by an external force in a certain direction, polarization can occur inside it, and positive and negative charges can appear on the two opposite surfaces of the dielectric material. When the external force is removed, the dielectric material can return to the uncharged state. This phenomenon is called the positive piezoelectric effect. When the direction of the applied force changes, the polarity of the charge changes accordingly. On the contrary, an inverse piezoelectric effect is that, when an electric field is applied to the dielectric material in the polarization direction, the dielectric material can deform, and the deformation disappears after the electric field is removed.

When the mechanical information of the cover detected by the force sensor device satisfies a preset condition, the driver of the feedback device applies an electric field to the deformable material, which can the deformable material to deform, and provide vibration force to provide operation feedback to the user. The driver may be, for example, an electric field generator.

The number of haptic feedback device may be single or plural. When the number of feedback devices is multiple, they may be evenly distributed at the surrounding area of the position acquisition device 620.

In some embodiments, the mechanical information of the cover may include the value of the pressing force that is applied to the cover in a direction perpendicular to the cover. When the pressing force value is greater than a preset pressing force threshold, the mechanical information of the cover may meet the preset condition, and a controller may send a drive-trigger signal to the haptic driver at this time.

Accordingly, when there are no physical buttons disposed on the upper surface of the cover, and the ForcePad is disposed under the entire glass cover, the user's pressing force cannot be directly transmitted to the ForcePad by clicking as in the case where physical buttons are disposed on the upper surface of the cover. In this situation, a force sensor such as an elastic wave sensor that can detect the vibration wave on the cover can be used to calculate the user's pressing force. At the same time, the use of variable materials can provide a reliable vibration feedback effect when the user's pressing force is detected, which can achieve more realistic simulation of physical buttons.

Figure 8:
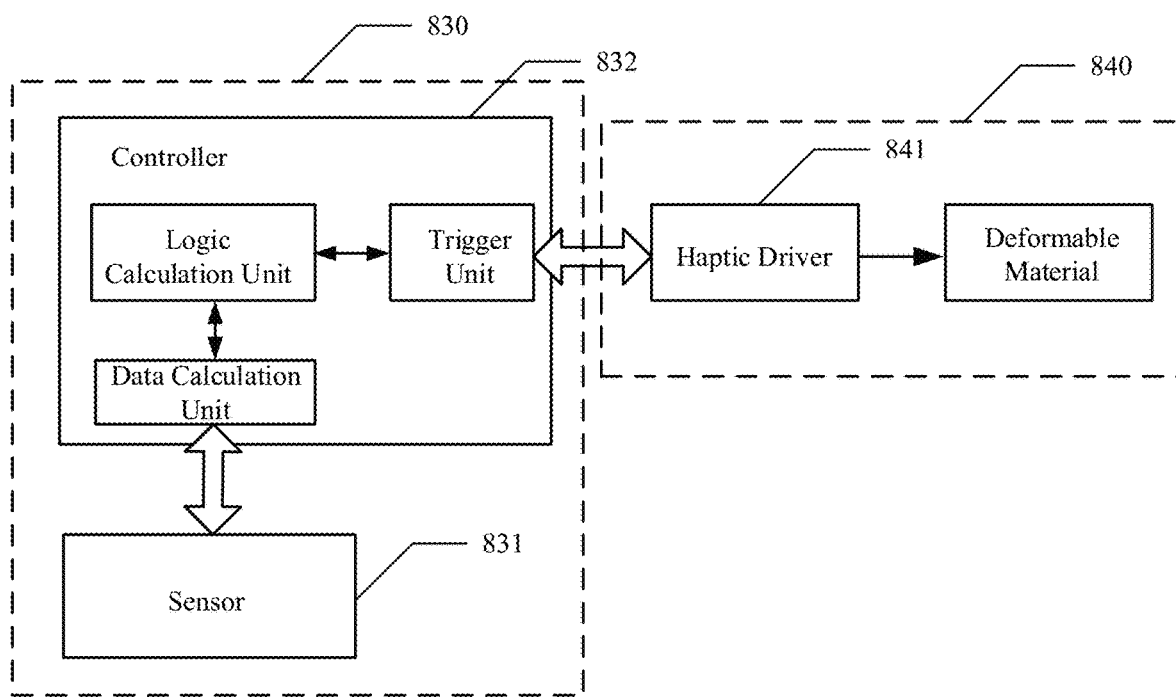
FIG. 8 illustrates a connection between a mechanical detection device and a haptic feedback device according to an embodiment of the present disclosure.

FIG. 8 illustrates a connection between a mechanical detection device and a haptic feedback device according to an embodiment of the present disclosure.

In some embodiments, as shown in FIG. 8, the force sensor 830 may include a sensor 831 and a controller 832. The sensor 831 may be an elastic wave sensor, which is configured to detect the vibration signal generated when the cover is subjected to the touch operation of the user. The vibration signal may transmit the vibration signal to a data collection unit of the controller 832.

The data collection unit of the controller 832 transmits the vibration signal collected from the sensor to a logic calculation unit. The logic calculation unit obtains the mechanical information of the cover according to the vibration signal, and sends the drive-trigger signal to the driver 841 of the feedback device 840 through a trigger unit.

In this embodiment, the controller can also determine parameters of the electric field that is applied to the deformable material according to the pressing force value when the pressing force value is greater than the preset value, and may send a drive-trigger signal containing the electric field parameters to the driver, so that the driver can apply the electric field to the surface of the deformable material according to the electric field parameters.

For example, when the user's pressing force is different, the controller can control the driver to apply electric fields of different strengths to the surface of the deformable material, so that the deformable material deforms to different degrees to provide vibration force of different strengths. In another example, when the pressing force is different, different regions of the deformable material may be controlled to deform. Specifically, when the pressing force is great, the electric field may be applied to the entire surface of the deformable material so that the entire deformable material may deform. When the pressing force is small, the electric field can be applied only to a surface of the partial area of the deformable material, so that only the partial area of the deformable material may deform.

Figure 9A:
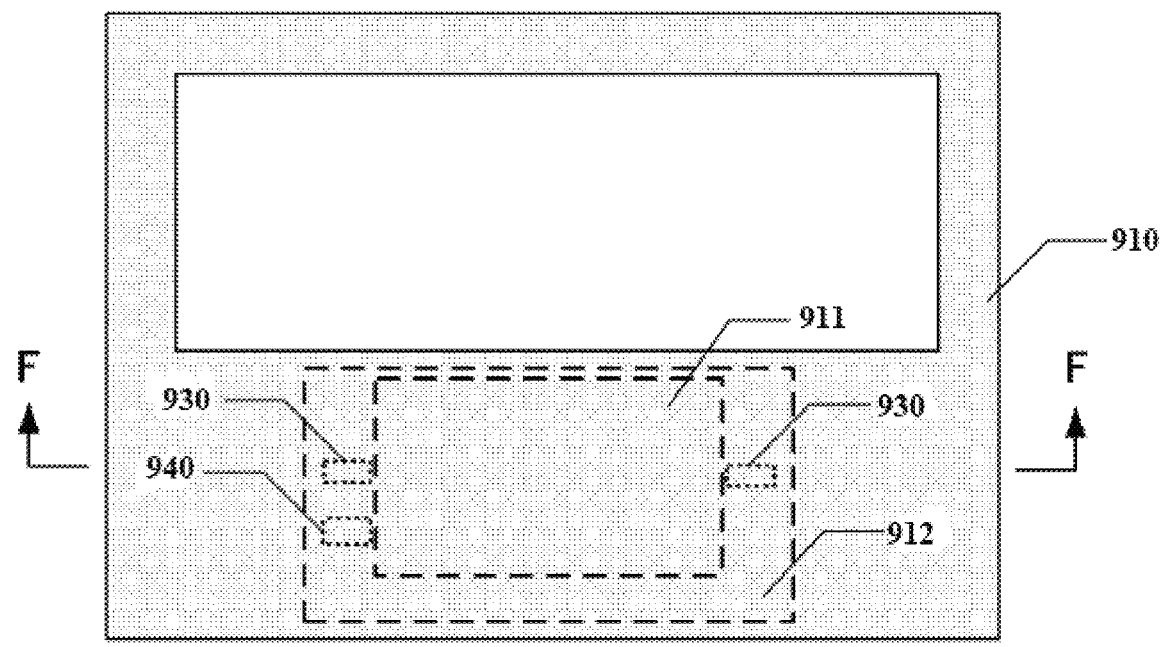
FIG. 9A is a schematic diagram of a spatial relationship among a cover, a touch sensing device, the mechanical detection device, and the haptic feedback device according to an embodiment of the present disclosure.
Figure 9B:
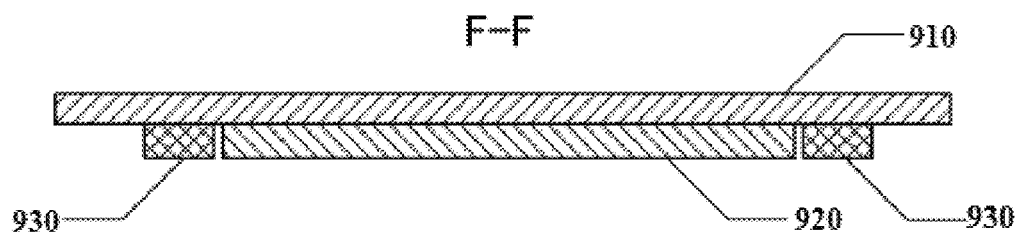
FIG. 9B is a schematic diagram of F-F cross-section in FIG. 9A.

According to the embodiments of the present disclosure, when no physical buttons are provided on the upper surface of the cover, a schematic diagram of a spatial relationship among a cover, a touch sensing device, the mechanical detection device, and the haptic feedback device is shown in FIG. 9A; and FIG. 9B is a schematic diagram of F-F cross-section in FIG. 9A.

According to an embodiment of the present disclosure, as shown in FIGS. 9A and 9B, the cover 910 may include a first cover area 911 and a second cover area 912 that is located on an outer periphery of the first cover area 911.

The range of the first cover region 911 corresponds to the position acquisition device. The position acquisition device may be stacked on the inner surface of the first cover area 911. Specifically, the sensing surface of the position acquisition device may fit to the inner surface of the first cover area 911, and the user can perform touch operation on the outer surface of the first cover area 911.

A force sensor 930 and a haptic feedback device 940 may be stacked on the inner surface of the second cover area 912. Specifically, the force sensor 930 may be an elastic wave sensor, and the haptic feedback device 940 may be a deformable material and they may fit to the inner surface of the second cover area 912. As such, the elastic wave sensor can directly fit to the inner surface of the cover to directly detect the vibration wave signal generated on the cover. The controller of the force sensor 930 may calculate the user's pressing force using the vibration wave signal, the position of the elastic wave sensor and the position of the touch point in combination. The deformable material can also directly fit to the inner surface of the cover to directly provide vibration force to the cover. This structure can reduce the overall thickness of the ForcePad component, so that the overall thickness of the ForcePad can be controlled within 1.0 mm, thereby saving more internal space for the electronic device.

In other embodiments of the present disclosure where no physical buttons are provided, a layer of circuit board may also be provided on the inner surface of the cover 910, e.g., an FPC, and the controller of the aforementioned force sensor 630 and the driver of the haptic feedback device 640 may be disposed on the FPC. An upper surface of the FPC may fit to the inner surface of the cover, the sensing surface of the position acquisition device, the force sensor 930 and the haptic feedback device 940 can fit to the lower surface of the FPC. Because the thickness of the FPC may be very thin, it basically cannot affect the functions of the position acquisition device, the force sensor, and the haptic feedback device.

Alternatively, the force sensor and the haptic feedback device can also be stacked on the inner surface of the position acquisition device; that is, the cover, the position acquisition device, the force sensor, and the feedback device may be stacked.

Figure 10A:
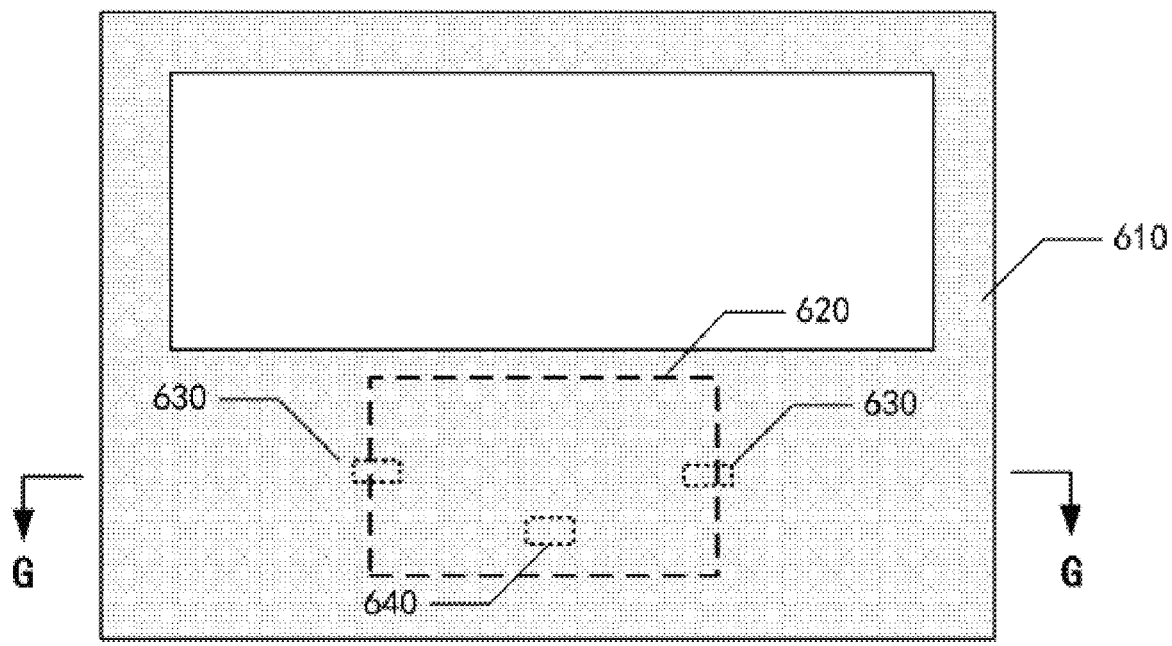
FIG. 10A illustrates a spatial relationship of the cover, the touch sensing device, the mechanical detection device, and the haptic feedback device according to an embodiment of the present disclosure.
Figure 10B:
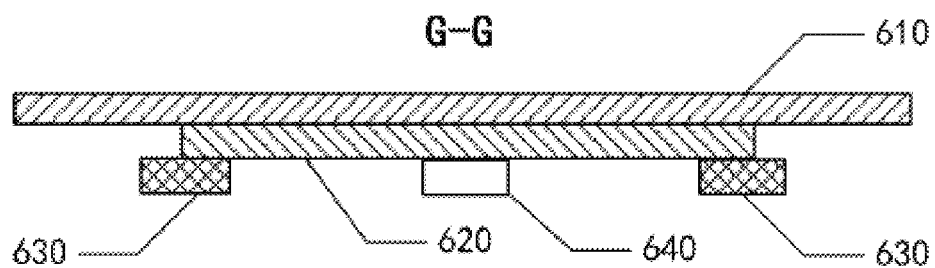
FIG. 10B is a schematic diagram of G-G cross-section in FIG. 10A.

FIG. 10A illustrates a spatial relationship of the cover, the touch sensing device, the mechanical detection device, and the haptic feedback device according to an embodiment of the present disclosure; and FIG. 10B is a schematic diagram of G-G cross-section in FIG. 10A. In FIG. 10B, a haptic feedback device 1040 is located behind the cross-section G-G, and the haptic feedback device 1040 is not blocked by other components.

As shown in FIGS. 10A and 10B, according to an embodiment of the present disclosure, a sensing surface of a position acquisition device 1020 may fit to the inner surface of a cover 1010, and at least a partial area of the force sensor 1030 may be stacked on a back surface of the position acquisition device 1020 opposite the sensing surface, at least a partial area of the feedback device 1040 overlaps with the back surface of the position acquisition device 1020.

Specifically, the sensing surface of the position acquisition device 1020 can directly fit to the inner surface of the cover, and the force sensor 1030 and the haptic feedback device 1040 can fit to the back surface of the position acquisition device 1020. The vibration wave on the cover can be transmitted to the force sensor 1030 through the position acquisition device 620, and the force sensor 1030 can calculate the user's pressing force based on the vibration wave signal in combination with the position of the elastic wave sensor and the position of the touch point. During the vibration feedback, the deformable material of the haptic feedback device 1040 can also transmit the vibration force to the cover 1010 through the position acquisition device 1020.

According to an embodiment of the present disclosure, when the haptic feedback is given without physical buttons, the electronic device may include a first body and a second body, and the first body can rotate relative to the second body. A cover, a position acquisition device, a force sensor and a haptic feedback device may be disposed on the second body. The cover may be a transparent hard material plate, and the cover may cover a surface of the second body opposite the first body.

Specifically, when the electronic device is a notebook computer, the first body may be, e.g., a screen portion of the notebook computer, and the second body may be, e.g., a base portion of the notebook computer. The cover may be, e.g., a transparent glass plate, which covers the surface of the base portion, may not include the keyboard area. The position acquisition device, the force sensor and the haptic feedback device may be disposed on the second body and cover a lower part of the cover.

Another aspect of the embodiments of the present disclosure provides a control method for the above-mentioned electronic device.

Figure 11:
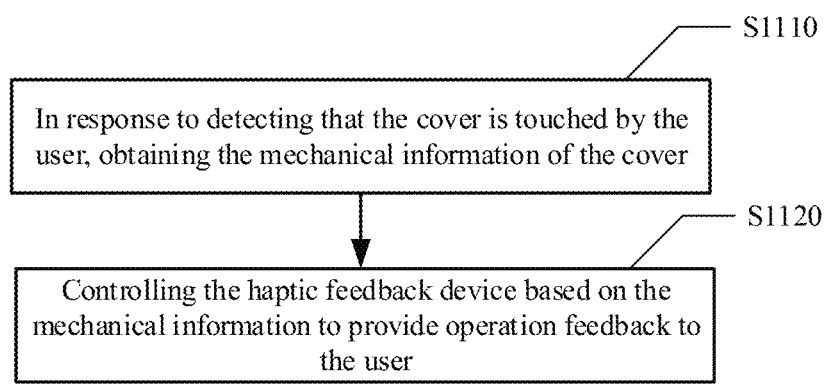
FIG. 11 illustrates a flowchart of a control method according to an embodiment of the present disclosure.

FIG. 11 illustrates a flowchart of a control method according to an embodiment of the present disclosure.

As shown in FIG. 11, the control method of the embodiment of the present disclosure may include steps S1110 to S1120:

In S1110, in response to detecting that the cover is touched by the user, the mechanical information of the cover may be obtained.

In S1120, the haptic feedback device may be controlled based on the mechanical information to provide operation feedback to the user.

Specifically, the control method of the embodiment of the present disclosure may be implemented by, e.g., the controller in the force sensor as described above. The controller may be implemented as a hardware circuit such as field-programmable gate array (FPGA), programmable logic array (PLA), system-on-chip, system on substrate, system on package, application-specific integrated circuit (ASIC), or it can be implemented by hardware or firmware that integrates or packages the circuit in any other reasonable means, or any one of the three implementation methods of software, hardware, and firmware, or any suitable combination of any of them. The controller may also include, e.g., a general-purpose microprocessor, an instruction set processor and/or related chipsets and/or a dedicated microprocessor (e.g., an application-specific integrated circuit (ASIC)), and so forth.

According to an embodiment of the present disclosure, obtaining the mechanical information of the cover may include: obtaining a vibration signal generated when the cover is subjected to a touch operation by the user; obtaining a pressing force value applied to the cover in a direction perpendicular to the cover based on the vibration signal; and determining whether the pressing force value is greater than a preset value.

Controlling the haptic feedback device to provide operation feedback to the user based on the mechanical information may include: when the pressing force value is greater than a preset value, sending a drive-trigger signal to the haptic feedback device to cause the haptic feedback device to generate a vibration force.

According to an embodiment of the present disclosure, causing the haptic feedback device to generate the vibration force based on the mechanical information may include: determining parameters of the electric field that is applied to a deformable material according to the pressing force value when the pressing force value is greater than the preset value; sending the drive-trigger signal including the electric field parameters to the driver, so that the driver can apply an electric field to a surface of the deformable material according to the electric field parameters.

Specifically, the description of the control method may be made with reference to FIG. 1 to FIG. 6B, and the corresponding descriptions, which will not be repeated here.

The present disclosure also provides a computer-readable storage medium. The computer-readable storage medium may be included in the device/system described in the above embodiments; or may exist alone without being assembled into the device/system. The computer-readable storage medium may store one or more programs. When the one or more programs are executed, the functions corresponding to the input information may be realized.

According to an embodiment of the present disclosure, the computer-readable storage medium may be a non-volatile computer-readable storage medium, which may include, but is not limited to, a portable computer disk, a hard disk, a random-access memory (RAM), and a read-only memory (ROM), an erasable programmable read-only memory (EPROM or flash memory), a portable compact disk read-only memory (CD-ROM), an optical storage device, a magnetic storage device, or any suitable combination thereof. In the present disclosure, the computer-readable storage medium may be any tangible medium that contains or stores a program, and the program may be used by or in combination with an instruction execution system, apparatus, or device.

The flowcharts and block diagrams in the drawings illustrate the possible implementation architecture, functions, and operations of systems, methods, and computer program products according to various embodiments of the present disclosure. In this regard, each block in the flowchart or block diagram may represent a module, a program segment, or a part of code, and the above-mentioned module, program segment, or part of code contains one or more executable instructions for implementing a specified logical function. It should also be noted that each block in the block diagram or flowchart, or a combination of blocks in the block diagram or flowchart, can be implemented with a dedicated hardware-based system that performs the specified function or operation, or can be realized by a combination of dedicated hardware and computer instructions.

Those skilled in the art may understand that the features recited in the various embodiments of the present disclosure may be combined in various ways, even if such combinations may not be explicitly described in the present disclosure. In particular, the features recited in the various embodiments of the present disclosure may be combined in various ways without departing from the spirit and teachings of the present disclosure. All of these combinations fall within the scope of this disclosure.

Although the present disclosure has been shown and described with reference to specific exemplary embodiments of the present disclosure, those skilled in the art should understand that without departing from the spirit and scope of the present disclosure as defined by the appended claims and their equivalents, variations in form and details can be made to the present disclosure. Therefore, the scope of the disclosure should not be limited to the above-described embodiments, but should be determined not only by the appended claims but also by the equivalents of the appended claims.

What is claimed is:

1. An input device, comprising:
a position acquisition device configured to obtain position information of at least one touch point;
a force sensor, configured to obtain input mechanical information of a pressing force that is applied to the at least one touch point; and
a processing unit, configured to determine input information based at least on the position information of the least one touch point and the mechanical information of the pressing force, wherein:
the position acquisition device and the force sensor are stacked on a cover of an electronic device;
the pressing force includes an elastic force, and the force sensor includes an elastic wave sensor configured to detect elastic waveforms corresponding to the elastic force; and
the processing unit is further configured to:
reduce noise of the elastic waveforms at a plurality of positions corresponding to different touch points based on the positions of different touch points; and
compensate the mechanical information based on compensation information to obtain the compensated mechanical information, wherein the compensation information is determined according to the position of an actual touch point that is obtained by the position acquisition device and a position calculated by the elastic wave sensor based on the elastic waveforms.

2. The input device according to claim 1, wherein:
the touch point is located on an outer surface of the cover in an area corresponding to the position acquisition device; and
the cover forms as at least a part of a housing of the electronic device.

3. The input device according to claim 1, wherein:
the position acquisition device is a capacitive touch sensor, the capacitive touch sensor including:
a capacitance detection layer attached to an inner surface of the cover; and
a circuit board disposed on the other side of the capacitance detection layer; wherein:
the outer surface of the cover corresponding to the capacitance layer provides a touch area; the processing unit is disposed on the circuit board; and the force sensor is connected to the circuit board, and is disposed on the inner surface of the cover at an area other than the circuit board.

4. The input device according to claim 3, wherein:
the elastic wave sensor is connected to the circuit board through a flexible printed circuit (FPC).

5. The input device according to claim 1, wherein the processing unit is further configured to calibrate the mechanical information based at least on the position information of the at least one touch point to obtain calibrated mechanical information, and determine the input information based on the position information of the at least one touch point and the calibrated mechanical information.

6. An electronic device, comprising:
a cover that forms at least a part of a housing of the electronic device and covers a specific surface of the electronic device; and
an input device, comprising:
a position acquisition device configured to obtain position information of at least one touch point;
a force sensor, configured to obtain input mechanical information of a pressing force that is applied to the at least one touch point; and
a processing unit, configured to determine input information based at least on the position information of the at least one touch point and the mechanical information of the pressing force;
a haptic feedback device disposed on the input device; and
a connection structure configured to fix the cover on the housing and block a transmission of the haptic feedback to the housing,
wherein:
the position acquisition device and the force sensor are stacked on an inner surface of the cover;
the force sensor is configured to detect the vibration signal and obtain the input mechanical information based on the vibration signal; and
the haptic feedback device is stacked on the inner surface of the cover, being configured to generate a vibration force based on the mechanical information and transmit the vibration force to the cover to provide operation feedback.

7. The electronic device according to claim 6, wherein:
the connection structure includes at least one of: a foam rubber and a soft rubber dot; and
a material of the cover includes at least one of: a glass material, a composite material, a polymer material, and a ceramic material.

8. The electronic device according to claim 6, wherein:
the cover includes a first cover area and a second cover area located on an outer periphery of the first cover area;
the position acquisition device is stacked on the inner surface of the first cover area;
the force sensor is stacked on the inner surface of the second cover area; and
the haptic feedback device is stacked on the inner surface of the second cover area.

9. The electronic device according to claim 6, wherein:
a sensing surface of the position acquisition device is attached to the inner surface of the cover;
at least a partial area of the force sensor is stacked on a back surface of the position acquisition device opposite the inner surface of the first cover; and at least a partial area of the haptic feedback device overlaps with the back surface of position acquisition device.

10. The electronic device according to claim 6, wherein:
the haptic feedback device comprises a haptic driver and a deformable material;
the driver is configured to apply an electric field to a surface of the deformable material according to the mechanical information, and drive the deformable material to deform, provide a vibration force, to provide operation feedback; and
the deformable material deforms when the surface of the material is subjected to the electric field.

11. The electronic device according to claim 10, wherein:
the force sensor comprises a sensor and a controller;
the sensor is configured to detect the vibration signal generated and transmit the vibration signal to the controller; and
the controller is configured to obtain the mechanical information of the cover according to the vibration signal, and send a drive-trigger signal to the driver according to the mechanical information, so that the driver drives the deformable material to deform according to the drive-trigger signal.

12. The electronic device according to claim 11, wherein:
the mechanical information of the cover includes a value of a pressing force that is applied to the cover in a direction perpendicular to the cover; and
the controller is configured to send the drive-trigger signal to the driver when the value of the pressing force value is greater than a preset value.

13. The electronic device according to claim 12, wherein:
the controller is further configured to: determine parameters of the electric field applied to the deformable material according to the pressing force value when the pressing force value is greater than a preset value; and send the drive-trigger signal including electric field parameters to the driver, causing the driver to apply the electric field to the surface of the deformable material according to the electric field parameters.

14. The electronic device according to claim 6, comprising:
a first body; and
a second body, the first body being rotatable relative to the second body; wherein:
the cover, the position acquisition device, the force sensor and the haptic feedback device are disposed on the second body; and
the cover is a transparent hard material cover, and covers a surface of the second body opposite the first body.

15. A control method for controlling an electronic device, comprising:
in response to detecting that a touch on a cover of the electronic device, obtaining, by a position acquisition device of the electronic device, position information of at least one touch point located on an upper surface of the cover, and obtaining, by an elastic wave sensor of the electronic device, mechanical information of a pressing force applied to the at least one touch point, wherein the pressing force includes an elastic force, and the elastic wave sensor is configured to detect elastic waveforms of the elastic force;
controlling, by a controller of the electronic device, a feedback device to provide operation feedback based on the mechanical information of the at least one touch point;
reducing, by a processing unit of the electronic device, noise of the elastic waveforms at a plurality of positions corresponding to different tough points based on the positions of different touch points; and
compensating, by the processing unit, the mechanical information based on compensation information to obtain the compensated mechanical information, wherein the compensation information is determined according to the position of an actual point that is obtained by the position acquisition device and a position calculated by the elastic wave sensor based on the elastic waveforms.

16. The control method according to claim 15, further comprising:
obtaining a vibration signal generated when the upper surface of the cover is touched;
obtaining the value of the pressing force that is applied to the upper surface of the cover in a direction perpendicular to the cover based on the vibration signal;
determining whether the pressing force value is greater than a preset value; wherein:
in response to the pressing force value being greater than the preset value, sending a drive-trigger signal to the feedback device to cause the feedback device to generate a vibration force.

* * * * *